United States Patent
Aoki et al.

(10) Patent No.: US 11,066,427 B2
(45) Date of Patent: Jul. 20, 2021

(54) ORGANOSILANE COMPOUNDS HAVING BULKY SUBSTITUENT AND PREPARATION THEREOF

(71) Applicant: Shin-Etsu Chemical Co., Ltd., Tokyo (JP)

(72) Inventors: Shotaro Aoki, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/893,185

(22) Filed: Jun. 4, 2020

(65) Prior Publication Data

US 2020/0385411 A1 Dec. 10, 2020

(30) Foreign Application Priority Data

Jun. 5, 2019 (JP) .............................. JP2019-105041

(51) Int. Cl.
C07F 7/08 (2006.01)
C07F 7/12 (2006.01)

(52) U.S. Cl.
CPC .............. C07F 7/081 (2013.01); C07F 7/123 (2013.01)

(58) Field of Classification Search
CPC .............. C07F 7/18; C07F 7/081; C07F 7/123
See application file for complete search history.

(56) References Cited

U.S. PATENT DOCUMENTS 4,748,262 A * 5/1988 Ishihara ................ C07F 7/1804
556/480
4,950,750 A * 8/1990 Ogawa ................... C07H 15/10
536/18.7
5,252,691 A * 10/1993 Watanabe ............. G03F 7/0758
526/279
2020/0369887 A1* 11/2020 Mori .................... C08G 77/045

FOREIGN PATENT DOCUMENTS

| CA | 3078393 A1 * | 4/2019 | .............. C07K 1/06 |
| JP | 63057592 A * | 3/1988 | |
| JP | 2002-356490 A | 12/2002 | |
| JP | 2003-201294 A | 7/2003 | |

OTHER PUBLICATIONS

English-Language Machine Translation of JP 63057592 (1988) (Year: 1988).*
K. Rama et al., 696 Journal of Organometallic Chemistry, 1957-1963 (2011) (Year: 2011).*

* cited by examiner

*Primary Examiner* — Alexander R Pagano
(74) *Attorney, Agent, or Firm* — Birch, Stewart, Kolasch & Birch, LLP (57) ABSTRACT

The invention provides an organosilane compound having a more bulky substituent group than the existing organosilane compounds. The compound is represented by formula (1) wherein $R^1$ is a $C_4$-$C_{10}$ tertiary hydrocarbon group, $R^2$ is a $C_1$-$C_{10}$ alkyl group, and LG is halogen or trifluoromethanesulfonyloxy.

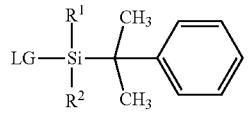

(1)

5 Claims, 8 Drawing Sheets

ORGANOSILANE COMPOUNDS HAVING BULKY SUBSTITUENT AND PREPARATION THEREOF

CROSS-REFERENCE TO RELATED APPLICATION

This non-provisional application claims priority under 35 U.S.C. § 119(a) on Patent Application No. 2019-105041 filed in Japan on Jun. 5, 2019, the entire contents of which are hereby incorporated by reference.

TECHNICAL FIELD

This invention relates to organosilane compounds having bulky substituent groups and a method for preparing the same.

BACKGROUND ART

Silylating agents are used for the protection of active hydrogen-containing substituent groups on such compounds as alcohols and carboxylic acids. The silylated compounds are useful as synthesis intermediates in various fields, for example, intermediates to low molecular weight medicines, peptide medicines, and agrichemicals.

Of prior art silylating agents, halosilane compounds and silyl triflate compounds are known from Patent Documents 1 and 2. Since these halosilane and silyl triflate compounds are more reactive than analogous silylating agents or hydrosilane compounds, they are advantageous in that active hydrogen-containing compounds such as alcohols and carboxylic acids can be readily silylated without a need for catalysts.

Examples of the known silylating agents include trimethylchlorosilane, triethylchlorosilane, tert-butyldimethylchlorosilane, trimethyliodosilane, trimethylsilyltriflate, triethylsilyltriflate, and tert-butyldimethylsilyltriflate, etc.

Also known are silylating agents having incorporated therein an aromatic substituent group such as aryl or benzyl, typically tert-butyldiphenylchlorosilane. These silylating agents having an aromatic substituent group incorporated therein are effective not only for protecting active hydrogen-containing substituent groups on alcohols, carboxylic acids or the like, but also for providing the silylated products with UV absorptivity. That is, the use of a silylating agent having an aromatic substituent group has the advantage that the progress of reaction can be readily monitored by a liquid chromatograph equipped with a UV detector.

CITATION LIST

Patent Document 1: JP-A 2002-356490
Patent Document 2: JP-A 2003-201294

DISCLOSURE OF INVENTION

The products silylated with the silylating agents, however, are susceptible to hydrolysis and lack satisfactory stability when their steric bulkiness is insufficient. Among others, those compounds having a silylated carboxyl group, i.e., of the chemical structure which is frequently found in low-molecular-weight medicines and peptide medicines, are less stable to hydrolysis. There exists a need for a silylating agent having a bulky substituent group so that the silylated product may be more stable.

An object of the invention is to provide an organosilane compound having a more bulky substituent group than the existing organosilane compounds.

The inventors have found that when an organosilane compound having bulky substituent groups, specifically two bulky tertiary hydrocarbon groups and one straight or branched alkyl group bonded to a silicon atom, is used as a silylating agent, the silylated product is stable.

In one aspect, the invention provides an organosilane compound having a bulky substituent group, represented by the general formula (1):

wherein $R^1$ is a $C_4$-$C_{10}$ tertiary hydrocarbon group, $R^2$ is a $C_1$-$C_{10}$ straight or branched alkyl group, and LG is halogen or trifluoromethanesulfonyloxy.

In one preferred embodiment, LG is halogen. In another preferred embodiment, LG is trifluoromethanesulfonyloxy.

In another aspect, the invention provides a method for preparing the organosilane compound of formula (1) wherein LG is halogen, comprising the step of reacting a hydrogensilane compound having the general formula (2) with a halogenating agent; and a method for preparing the organosilane compound of formula (1) wherein LG is trifluoromethanesulfonyloxy, comprising the step of reacting a hydrogensilane compound having the general formula (2) with trifluoromethanesulfonic acid.

Herein $R^1$ and $R^2$ are as defined above.

Advantageous Effects of Invention

Since the organosilane compound has bulky substituent groups on a silicon atom, the product silylated therewith is fully stable to hydrolysis. Due to the inclusion of a phenyl-containing substituent group on a silicon atom, the silylating reaction using the inventive organosilane compound or de-silylating reaction can be readily monitored by a liquid chromatograph equipped with a UV detector.

DESCRIPTION OF PREFERRED EMBODIMENTS

One embodiment of the invention is an organosilane compound having bulky substituent groups, represented by the general formula (1). The organosilane compound having bulky substituent groups is less sensitive to airborne moisture as compared with organosilane compounds free of a bulky substituent group, such as trimethylchlorosilane and trimethylsilyltriflate. The inventive organosilane compound is easy to handle because it generates little or no hydrohalic acid such as hydrochloric acid or trifluoromethanesulfonic acid on use.

(1)

In formula (1), $R^1$ is a $C_4$-$C_{10}$, preferably $C_4$-$C_9$ tertiary hydrocarbon group, $R^2$ is a $C_1$-$C_{10}$, preferably $C_1$-$C_6$, more preferably $C_1$-$C_3$ straight or branched alkyl group, and LG is halogen or trifluoromethanesulfonyloxy.

Examples of the $C_4$-$C_{10}$ tertiary hydrocarbon group $R^1$ include tert-butyl, tert-pentyl, 1,1-diethylpropyl, 1,1,2-trimethylpropyl, 1-methylcyclopentyl, 1-methylcyclohexyl, 1-methyl-1-phenylethyl, 1,1-dimethyl-2-phenylethyl. When such a substituent group is introduced on a silicon atom, a corresponding halide must be used. For availability of the halide, $R^1$ is preferably tert-butyl or 1-methyl-1-phenylethyl.

Examples of the $C_1$-$C_{10}$ straight or branched alkyl group $R^2$ include straight alkyl groups such as methyl, ethyl, n-propyl, n-butyl, n-pentyl, n-hexyl, n-heptyl, n-octyl, n-nonyl and n-decyl, and branched alkyl groups such as isobutyl, isopentyl, neopentyl, isohexyl, isoheptyl, isooctyl, isononyl, and isodecyl. For the reason that the substituent group on silicon becomes less reactive as it becomes more bulky, it is preferred from the aspect of insuring the overall reactivity of an organosilane compound that $R^2$ be a straight alkyl group which is less bulky than the other substituent groups on silicon, especially methyl or ethyl.

Exemplary of the halogen atom LG are chlorine, bromine and iodine. Inter alia, chlorine is preferred from the aspect of availability of a reactant used in the synthesis of an organosilane compound.

Of the organosilane compounds having formula (1), organosilane compounds wherein LG is halogen are represented by the general formula (1A), and organosilane compounds wherein LG is trifluoromethanesulfonyloxy are represented by the general formula (1B). The halogen and trifluoromethanesulfonyloxy are appropriate as LG because they are readily eliminatable.

(1A)

(1B)

Herein $R^1$ and $R^2$ are as defined above, and X is halogen.

Examples of the organosilane compound having formula (1A) include chlorosilane compounds such as tert-butylmethyl(1-methyl-1-phenylethyl)chlorosilane, tert-pentylmethyl(1-methyl-1-phenylethyl)chlorosilane, (1,1-diethylpropyl)methyl(1-methyl-1-phenylethyl)chlorosilane, methyl(1-methyl-1-phenylethyl)(1,1,2-trimethylpropyl)chlorosilane, methyl(1-methylcyclopentyl)(1-methyl-1-phenylethyl)chlorosilane, bis(1-methyl-1-phenylethyl)methylchlorosilane, (1,1-dimethyl-2-phenylethyl)methyl(1-methyl-1-phenylethyl)chlorosilane, tert-butyl ethyl(1-methyl-1-phenylethyl)chlorosilane, tert-pentyl ethyl(1-methyl-1-phenylethyl)chlorosilane, (1,1-diethylpropyl)ethyl(1-methyl-1-phenylethyl)chlorosilane, ethyl(1-methyl-1-phenylethyl)(1,1,2-trimethylpropyl)chlorosilane, ethyl(1-methylcyclopentyl)(1-methyl-1-phenylethyl)chlorosilane, bis(1-methyl-1-phenylethyl)ethylchlorosilane, (1,1-dimethyl-2-phenylethyl)ethyl(1-methyl-1-phenylethyl)chlorosilane; bromosilane compounds such as tert-butylmethyl(1-methyl-1-phenylethyl)bromosilane, tert-pentylmethyl(1-methyl-1-phenylethyl)bromosilane, (1,1-diethylpropyl)methyl(1-methyl-1-phenylethyl)bromosilane, methyl(1-methyl-1-phenylethyl)(1,1,2-trimethylpropyl)bromosilane, methyl(1-methylcyclopentyl)(1-methyl-1-phenylethyl)bromosilane, bis(1-methyl-1-phenylethyl)methylbromosilane, (1,1-dimethyl-2-phenylethyl)methyl(1-methyl-1-phenylethyl)bromosilane, tert-butyl ethyl(1-methyl-1-phenylethyl)bromosilane, tert-pentyl ethyl(1-methyl-1-phenylethyl)bromosilane, (1,1-diethylpropyl)ethyl(1-methyl-1-phenylethyl)bromosilane, ethyl(1-methyl-1-phenylethyl)(1,1,2-trimethylpropyl)bromosilane, ethyl(1-methylcyclopentyl)(1-methyl-1-phenylethyl)bromosilane, bis(1-methyl-1-phenylethyl)ethylbromosilane, (1,1-dimethyl-2-phenylethyl)ethyl(1-methyl-1-phenylethyl)bromosilane; iodosilane compounds such as tert-butylmethyl(1-methyl-1-phenylethyl)iodosilane, tert-pentylmethyl(1-methyl-1-phenylethyl)iodosilane, (1,1-diethylpropyl)methyl(1-methyl-1-phenylethyl)iodosilane, methyl(1-methyl-1-phenylethyl)(1,1,2-trimethylpropyl)iodosilane, methyl(1-methylcyclopentyl)(1-methyl-1-phenylethyl)iodosilane, bis(1-methyl-1-phenylethyl)methyliodosilane, (1,1-dimethyl-2-phenylethyl)methyl(1-methyl-1-phenylethyl)iodosilane, tert-butyl ethyl(1-methyl-1-phenylethyl)iodosilane, tert-pentyl ethyl(1-methyl-1-phenylethyl)iodosilane, (1,1-diethylpropyl)ethyl(1-methyl-1-phenylethyl)iodosilane, ethyl(1-methyl-1-phenylethyl)(1,1,2-trimethylpropyl)iodosilane, ethyl(1-methylcyclopentyl)(1-methyl-1-phenylethyl)iodosilane, bis(1-methyl-1-phenylethyl)ethyliodosilane, (1,1-dimethyl-2-phenylethyl)ethyl(1-methyl-1-phenylethyl)iodosilane.

Examples of the organosilane compound having formula (1B) include silyltriflate compounds such as tert-butylmethyl(1-methyl-1-phenylethyl)silyltriflate, tert-pentylmethyl(1-methyl-1-phenylethyl)silyltriflate, (1,1-diethylpropyl)methyl(1-methyl-1-phenylethyl)silyltriflate, methyl(1-methyl-1-phenylethyl)(1,1,2-trimethylpropyl)silyltriflate, methyl(1-methylcyclopentyl)(1-methyl-1-phenylethyl)silyltriflate, bis(1-methyl-1-phenylethyl)methyl silyltriflate, (1,1-dimethyl-2-phenylethyl)methyl(1-methyl-1-phenylethyl)silyltriflate, tert-butyl ethyl(1-methyl-1-phenylethyl)silyltriflate, tert-pentylethyl(1-methyl-1-phenylethyl)silyltriflate, (1,1-diethylpropyl)ethyl(1-methyl-1-phenylethyl)silyltriflate, ethyl(1-methyl-1-phenylethyl)(1,1,2-trimethylpropyl)silyltriflate, ethyl(1-methylcyclopentyl)(1-methyl-1-phenylethyl)silyltriflate, bis(1-methyl-1-phenylethyl)ethyl silyltriflate, (1,1-dimethyl-2-phenylethyl)ethyl(1-methyl-1-phenylethyl)silyltriflate.

Another embodiment of the invention is a method for preparing the bulky substituent-containing organosilane compound having formula (1A) or (1B). The organosilane compound having formula (1A) may be prepared by reacting a hydrogensilane compound having the general formula (2) with a halogenating agent. The organosilane compound having formula (1B) may be prepared by reacting a hydrogensilane compound having the general formula (2) with trifluoromethanesulfonic acid.

(2)

Herein R¹ and R² are as defined above.

First referring to the preparation of the organosilane compound having formula (1A), the halogenating agent used therefor may be selected from well-known chlorinating, brominating and iodizing agents. Suitable chlorinating agents include chlorine sources such as chlorine, thionyl chloride, hydrochloric acid, allyl chloride, and methallyl chloride, optionally in admixture with a palladium catalyst. Suitable brominating agents include bromine sources such as bromine, carbon tetrabromide, N-bromosuccinimide, and boron tribromide. Suitable iodizing agents include iodine sources such as iodine, hydroiodic acid, carbon tetraiodide, and N-iodosuccinimide.

In the case of organosilane compounds having an aromatic substituent group on silicon such as benzyl or aryl group, the substituent group is unstable under halogenating conditions such as chlorinating conditions using the chlorinating agent, and it can be eliminated. In contrast, in the case of hydrogensilane compounds having a 1-methyl-1-phenylethyl group on silicon, represented by formula (2), the 1-methyl-1-phenylethyl group is stable under acidic conditions because of its bulkiness, and thus difficultly eliminated under reaction conditions using the chlorinating agent.

Although the amount of the halogen source used in the reaction of the hydrogensilane compound having formula (2) with the chlorinating agent is not particularly limited, it is preferred from the standpoint of environmental load to use 0.5 to 10.0 moles, more preferably 0.8 to 5.0 moles of the halogen source per mole of the hydrogensilane compound having formula (2).

Suitable palladium catalysts used in this reaction include palladium salts such as palladium chloride and palladium acetate, palladium complexes such as dichlorobistriphenylphosphine palladium, and palladium-carbon. Although the amount of the palladium catalyst used is not particularly limited, it is preferred from the standpoint of environmental load to use 0.0001 to 0.05 mole, more preferably 0.001 to 0.02 mole of the palladium catalyst per mole of the hydrogensilane compound having formula (2).

Although the pressure under which the reaction is performed is not particularly limited, atmospheric pressure is preferred in view of safety during preparation. Although the reaction temperature is not particularly limited, a temperature of 0 to 200° C., especially 50 to 100° C. is preferred in view of reaction rate. Although the reaction time is not particularly limited, a time of 1 to 40 hours, especially 1 to 20 hours is preferred in view of production efficiency. With respect to the reaction atmosphere, an inert gas atmosphere such as nitrogen or argon is preferred in view of safety during preparation.

Although the reaction takes place in a solventless system, a solvent may be used. Suitable solvents include hydrocarbon solvents such as pentane, hexane, cyclohexane, heptane, isooctane, benzene, toluene and xylene; ether solvents such as diethyl ether, tetrahydrofuran and dioxane; ester solvents such as ethyl acetate and butyl acetate; aprotic polar solvents such as acetonitrile, N,N-dimethylformamide and N-methylpyrrolidone; chlorinated hydrocarbon solvents such as dichloromethane and chloroform, which may be used alone or in admixture.

The organosilane compound having formula (1A) resulting from the above method may be purified by a suitable purifying means, depending on the desired quality, prior to use. Although various purifying means are known, for example, distillation, filtration, washing, column separation and solid adsorbents, the purification by distillation is preferred in order to reach a high purity.

Reference is made to the preparation of the organosilane compound having formula (1B) through reaction of a hydrogensilane compound having formula (2) with trifluoromethanesulfonic acid. Although the amount of trifluoromethanesulfonic acid used is not particularly limited, it is preferred from the standpoint of environmental load to use 0.5 to 2.0 moles, more preferably 0.8 to 1.2 moles of trifluoromethanesulfonic acid per mole of the hydrogensilane compound having formula (2).

The hydrogensilane compound having formula (2) is stable under acidic conditions because it has a bulky 1-methyl-1-phenylethyl group as mentioned above. The 1-methyl-1-phenylethyl group is difficultly eliminated even under reaction conditions using trifluoromethanesulfonic acid.

Although the pressure under which the reaction is performed is not particularly limited, atmospheric pressure is preferred in view of safety during preparation. Although the reaction temperature is not particularly limited, a temperature of –80° C. to 150° C., especially –20° C. to 40° C. is preferred in view of reaction rate. Although the reaction time is not particularly limited, a time of 1 to 40 hours, especially 1 to 10 hours is preferred in view of production efficiency. With respect to the reaction atmosphere, an inert gas atmosphere such as nitrogen or argon is preferred in view of safety during preparation.

Although the reaction takes place in a solventless system, a solvent may be used. Suitable solvents are as described above for the preparation of the organosilane compound having formula (1A).

The organosilane compound having formula (1B) resulting from the above method may be purified by a suitable purifying means, depending on the desired quality, prior to use. Although various purifying means are known, for example, distillation, filtration, washing, column separation and solid adsorbents, the purification by distillation is preferred in order to reach a high purity.

EXAMPLES

Examples of the invention are given below by way of illustration and not by way of limitation.

Example 1

Synthesis of bis(1-methyl-1-phenylethyl)methylchlorosilane

A four-neck flask equipped with a stirrer, reflux condenser, dropping funnel and thermometer was purged with nitrogen. While nitrogen gas was fed to the open top of the reflux condenser to block the entry of ambient air, the flask was charged with 1.4 g (5.00 mmol) of bis(1-methyl-1-phenylethyl)methylsilane, 2.3 g (25.00 mmol) of methallyl chloride, and 11.2 mg (0.05 mmol) of palladium acetate, which were stirred at 150° C. for 20 hours. The reaction solution was passed through a 0.5-μm membrane filter. The filtrate was concentrated at 50° C./5.0 kPa, yielding 1.4 g of a pale yellow liquid.

The liquid was analyzed by mass spectroscopy, $^1$H-NMR spectroscopy (deuterated chloroform), and IR spectroscopy. The results of mass spectroscopy are shown below.

m/z 316, 197, 155, 119, 93

Figure 1:
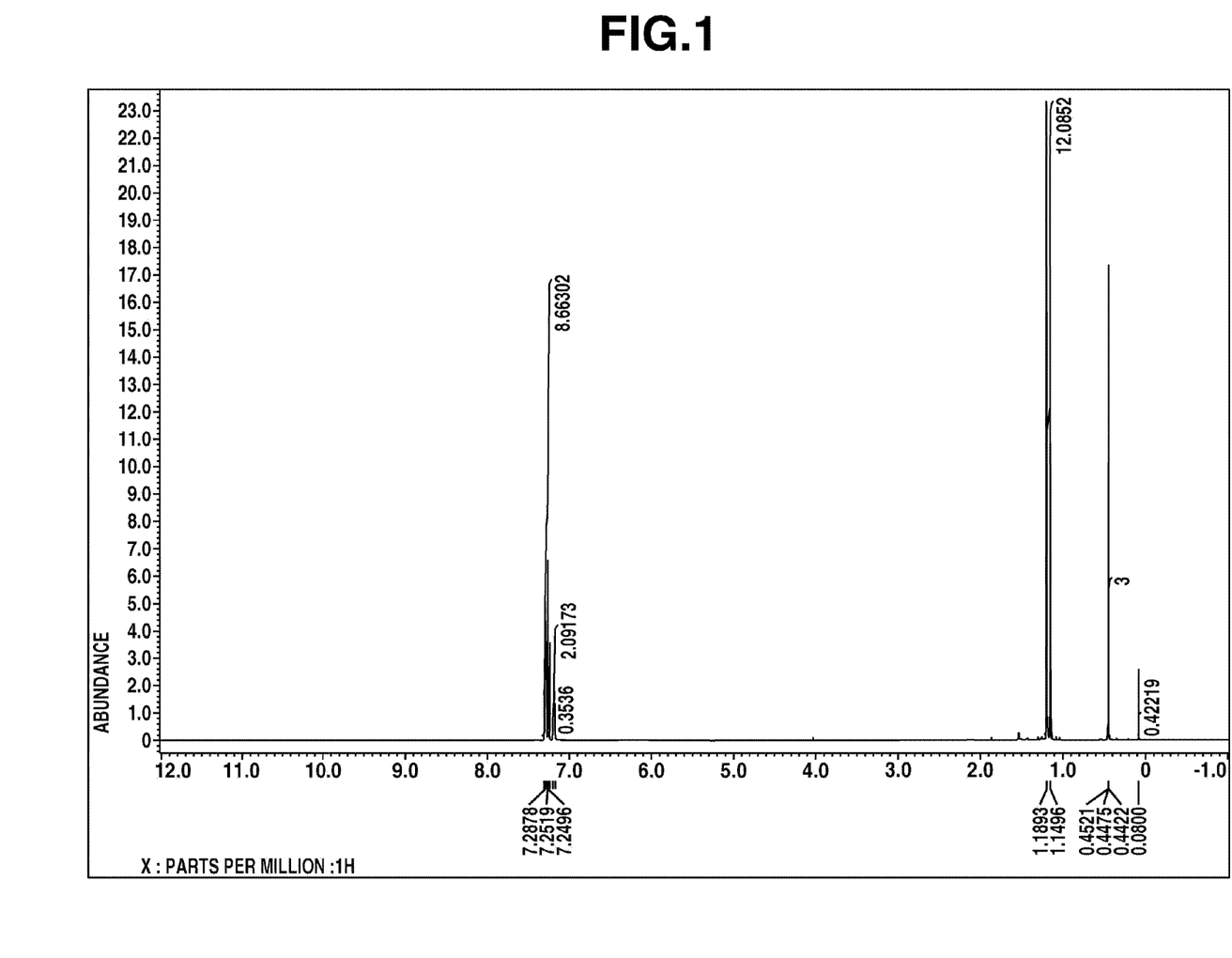
FIG. 1 is a diagram showing the $^1$H-NMR spectrum of the compound in Example 1.
Figure 2:
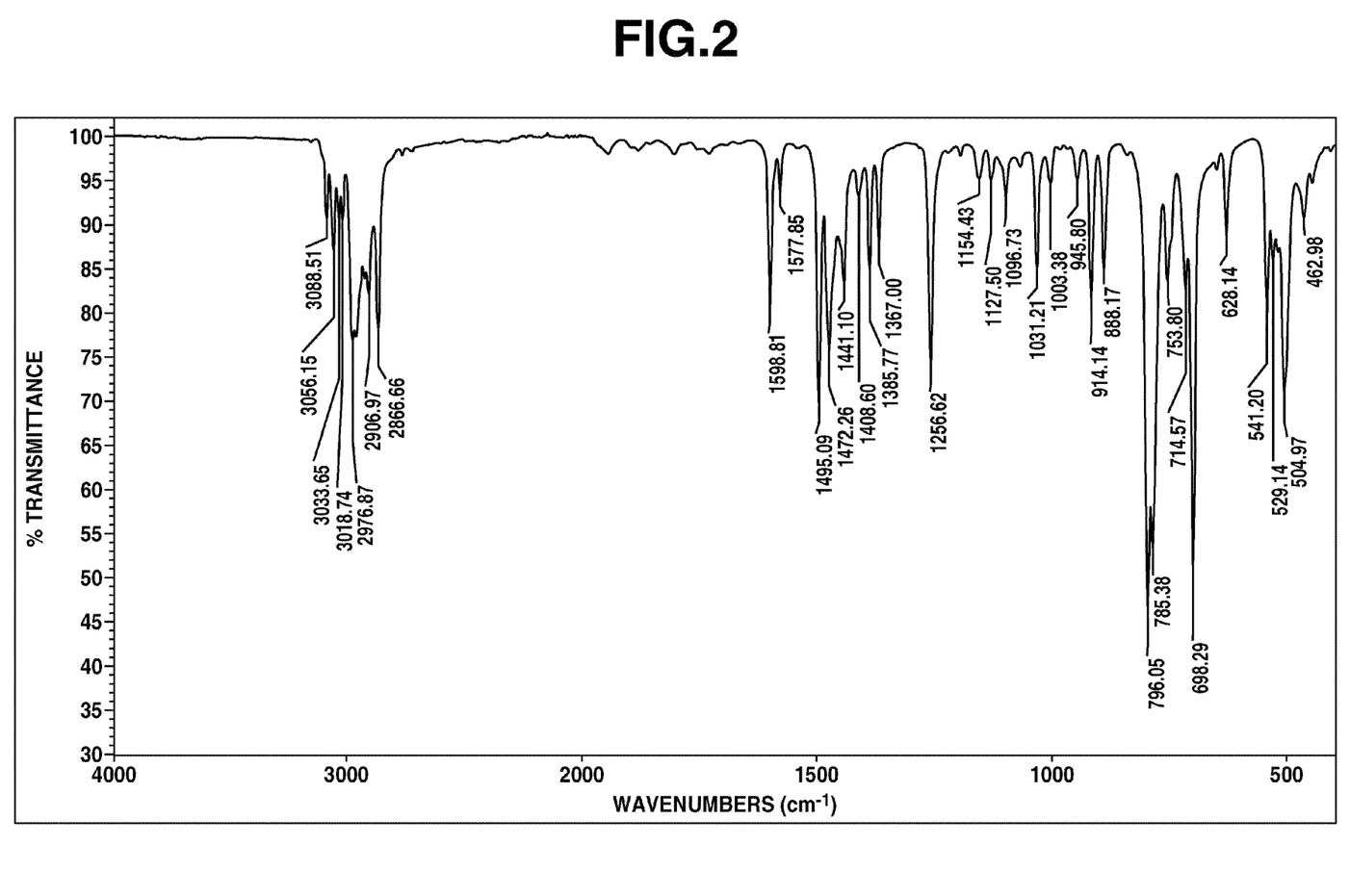
FIG. 2 is a diagram showing the IR spectrum of the compound in Example 1.

The $^1$H-NMR spectral chart is shown in FIG. 1 and the IR spectral chart is shown in FIG. 2.

From these results, the resulting compound was identified to be bis(1-methyl-1-phenylethyl)methylchlorosilane.

Example 2

Synthesis of bis(1-methyl-1-phenylethyl)methylsilyltriflate

A four-neck flask equipped with a stirrer, reflux condenser, dropping funnel and thermometer was purged with nitrogen. While nitrogen gas was fed to the open top of the reflux condenser to block the entry of ambient air, the flask was charged with 14.1 g (50.00 mmol) of bis(1-methyl-1-phenylethyl)methylsilane, which was stirred at 0° C. 7.4 g (49.00 mmol) of trifluoromethanesulfonic acid was added dropwise, after which the contents were stirred at room temperature for 2 hours. The reaction solution was distilled, collecting 11.3 g of a fraction of boiling point 178° C./0.4 kPa.

The fraction was analyzed by mass spectroscopy, $^1$H-NMR spectroscopy (deuterated chloroform), and IR spectroscopy. The results of mass spectroscopy are shown below.

m/z 311, 227, 181, 139, 119, 91

Figure 3:
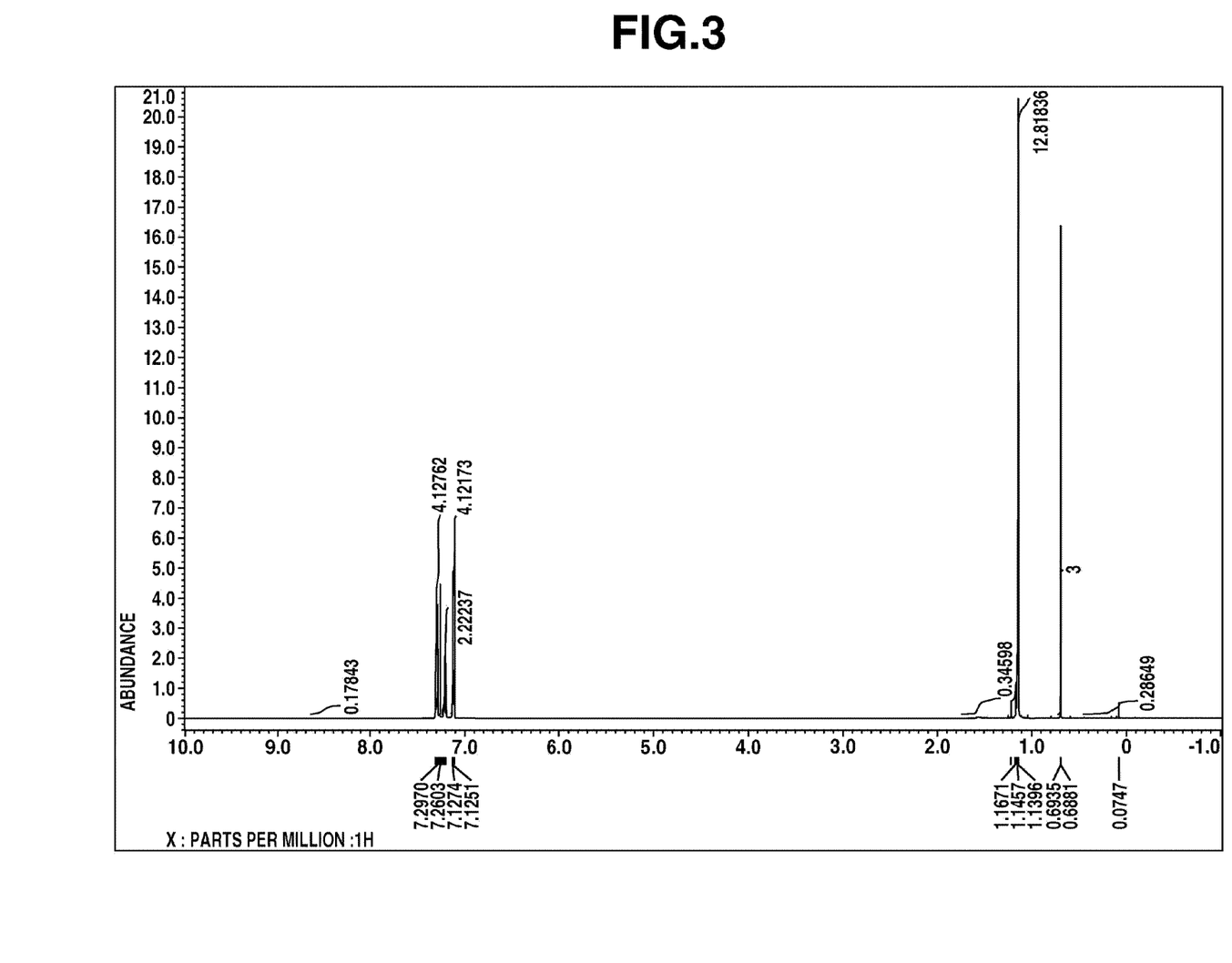
FIGS. 3 and 4 are diagrams showing the $^1$H-NMR and IR spectra of the compound in Example 2, respectively.
Figure 4:
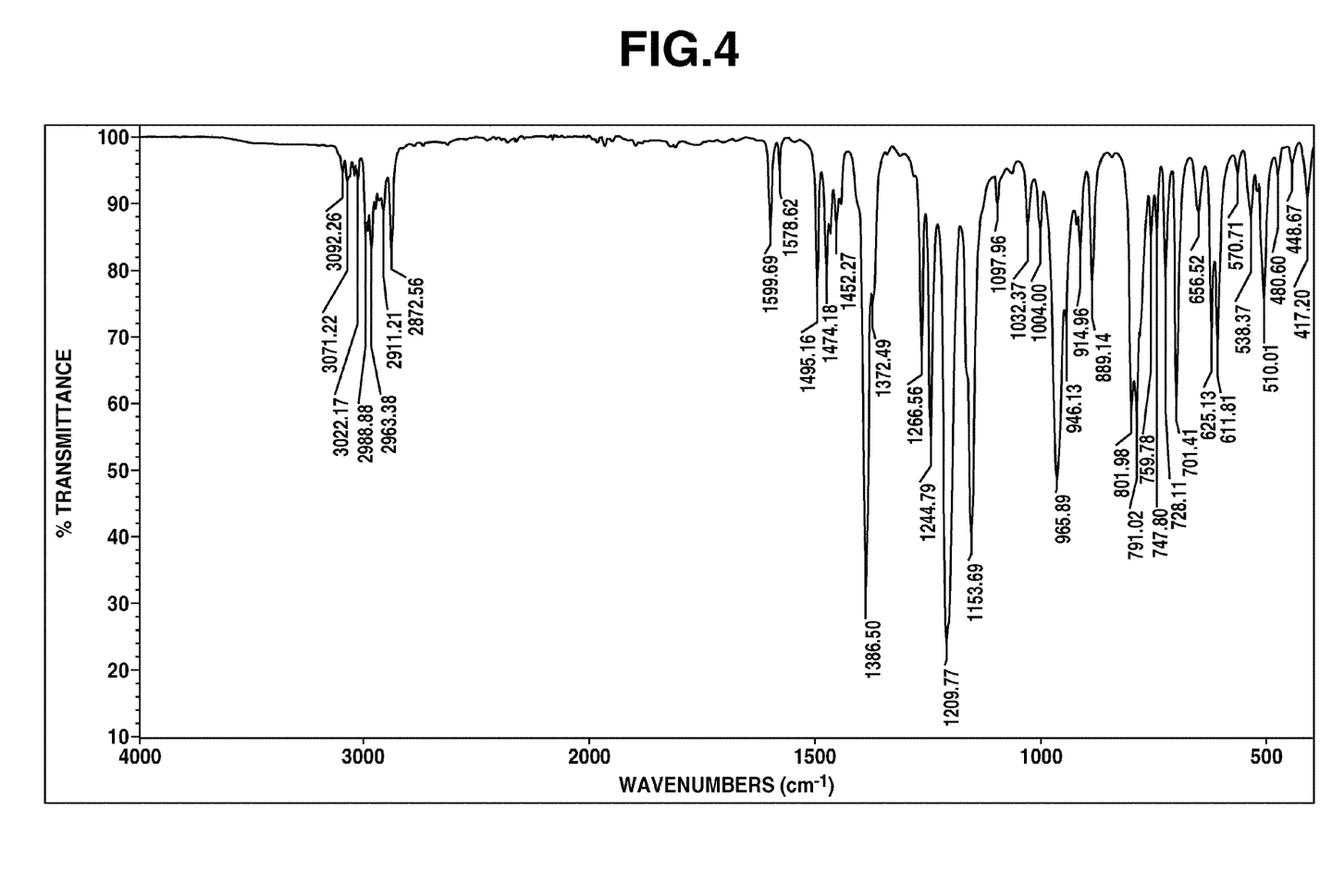

The $^1$H-NMR spectral chart is shown in FIG. 3 and the IR spectral chart is shown in FIG. 4.

From these results, the resulting compound was identified to be bis(1-methyl-1-phenylethyl)methyl silyltriflate.

Example 3

Synthesis of tert-butylmethyl(1-methyl-1-phenylethyl)chlorosilane

A four-neck flask equipped with a stirrer, reflux condenser, dropping funnel and thermometer was purged with nitrogen. While nitrogen gas was fed to the open top of the reflux condenser to block the entry of ambient air, the flask was charged with 1.1 g (5.00 mmol) of tert-butylmethyl(1-methyl-1-phenylethyl)silane, 2.3 g (25.00 mmol) of methallyl chloride, and 11.2 mg (0.05 mmol) of palladium acetate, which were stirred at 150° C. for 11 hours. The reaction solution was passed through a 0.5-μm membrane filter. The filtrate was concentrated at 50° C./5.0 kPa, yielding 1.2 g of a pale yellow liquid.

The liquid was analyzed by mass spectroscopy, $^1$H-NMR spectroscopy (deuterated chloroform), and IR spectroscopy. The results of mass spectroscopy are shown below.

m/z 254, 155, 135, 118, 93, 41

Figure 5:
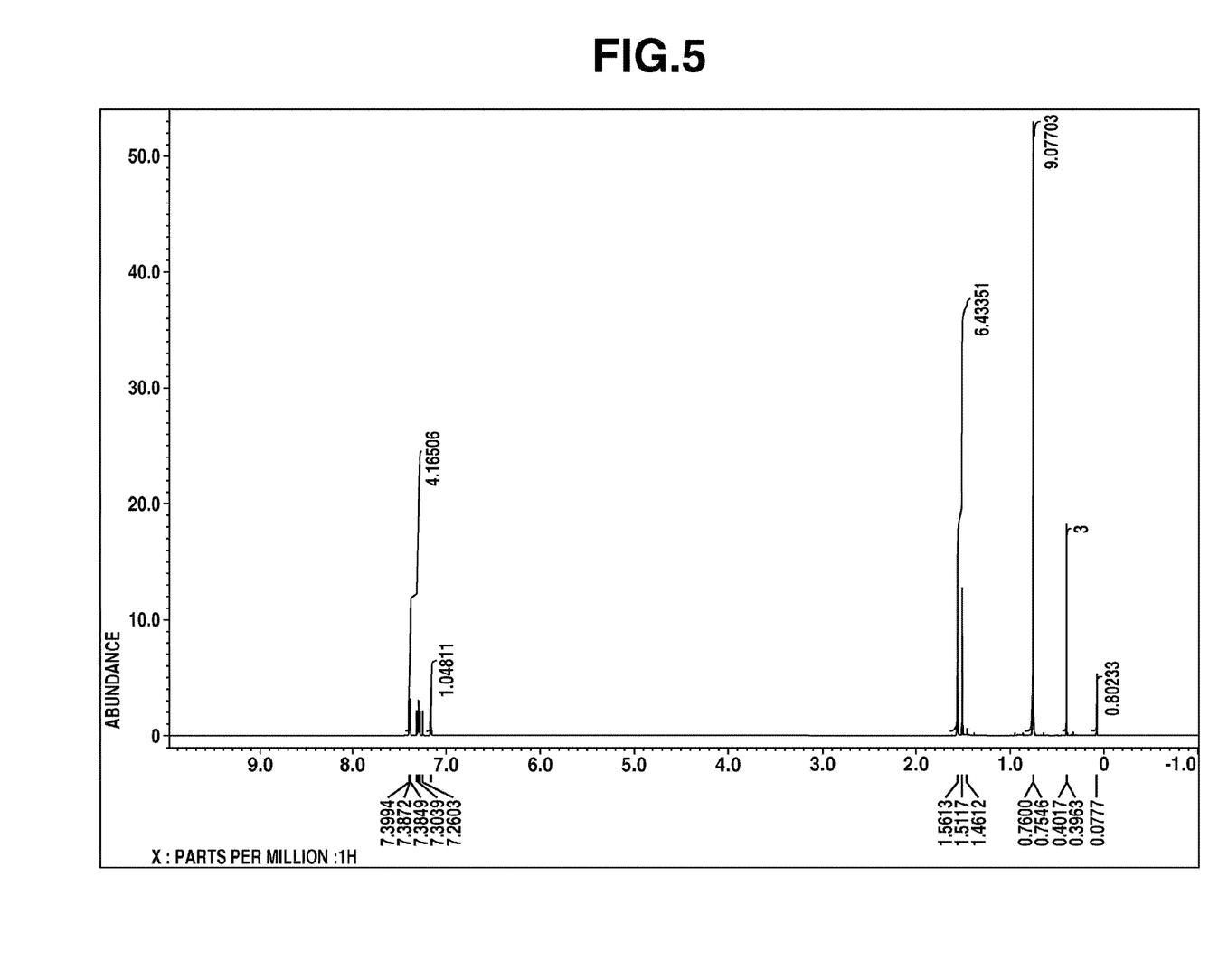
FIGS. 5 and 6 are diagrams showing the $^1$H-NMR and IR spectra of the compound in Example 3, respectively.
Figure 6:
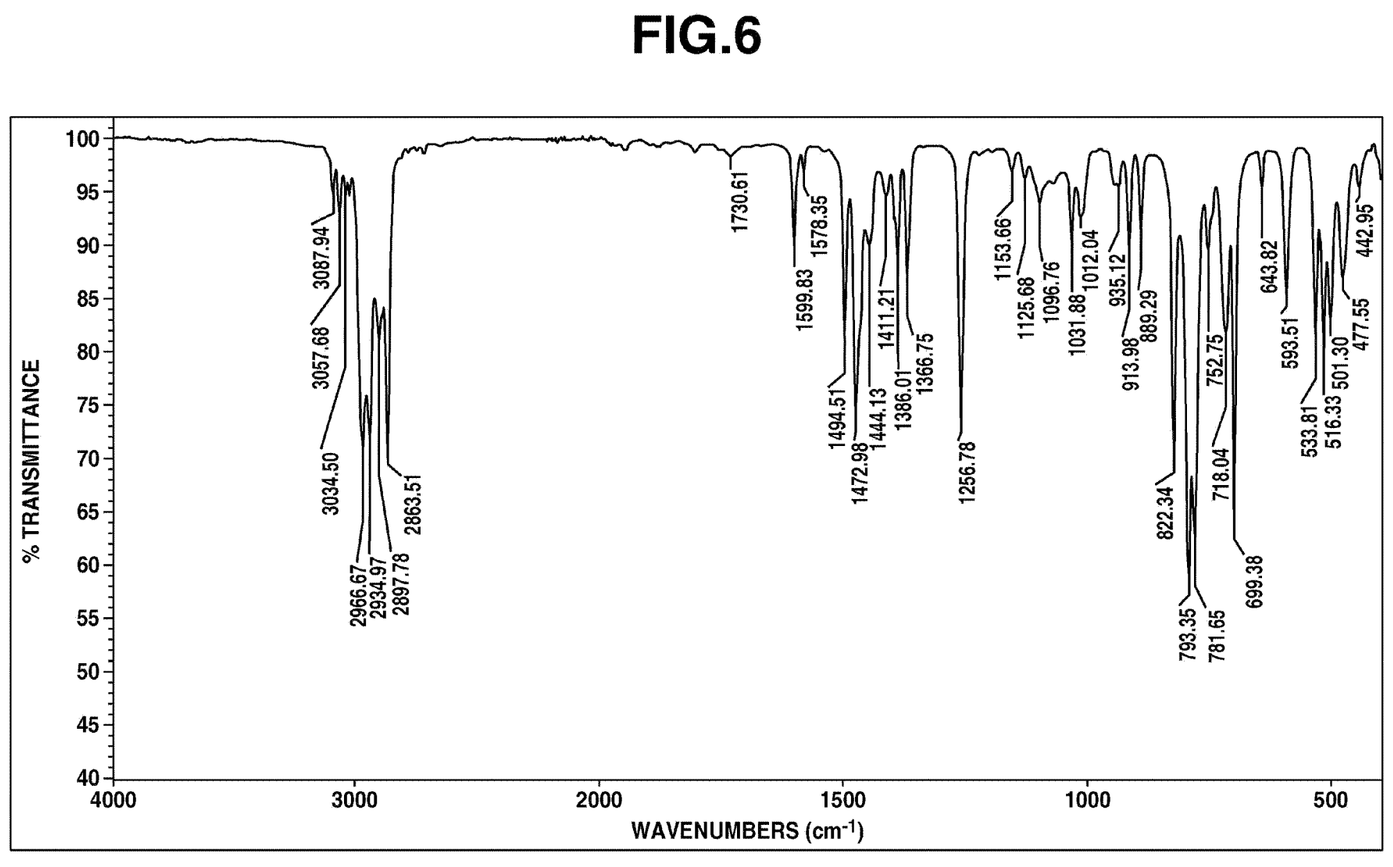

The $^1$H-NMR spectral chart is shown in FIG. 5 and the IR spectral chart is shown in FIG. 6.

From these results, the resulting compound was identified to be tert-butylmethyl(1-methyl-1-phenylethyl)chlorosilane.

Example 4

Synthesis of tert-butylmethyl(1-methyl-1-phenylethyl)silyltriflate

A four-neck flask equipped with a stirrer, reflux condenser, dropping funnel and thermometer was purged with nitrogen. While nitrogen gas was fed to the open top of the reflux condenser to block the entry of ambient air, the flask was charged with 2.2 g (10.00 mmol) of tert-butylmethyl (1-methyl-1-phenylethyl)silane, which was stirred at 0° C. 1.5 g (9.80 mmol) of trifluoromethanesulfonic acid was added dropwise, after which the contents were stirred at room temperature for 2 hours, obtaining 3.4 g of a colorless transparent liquid.

The liquid was analyzed by mass spectroscopy, $^1$H-NMR spectroscopy (deuterated chloroform), and IR spectroscopy. The results of mass spectroscopy are shown below.

m/z 368, 249, 119, 77, 41

Figure 7:
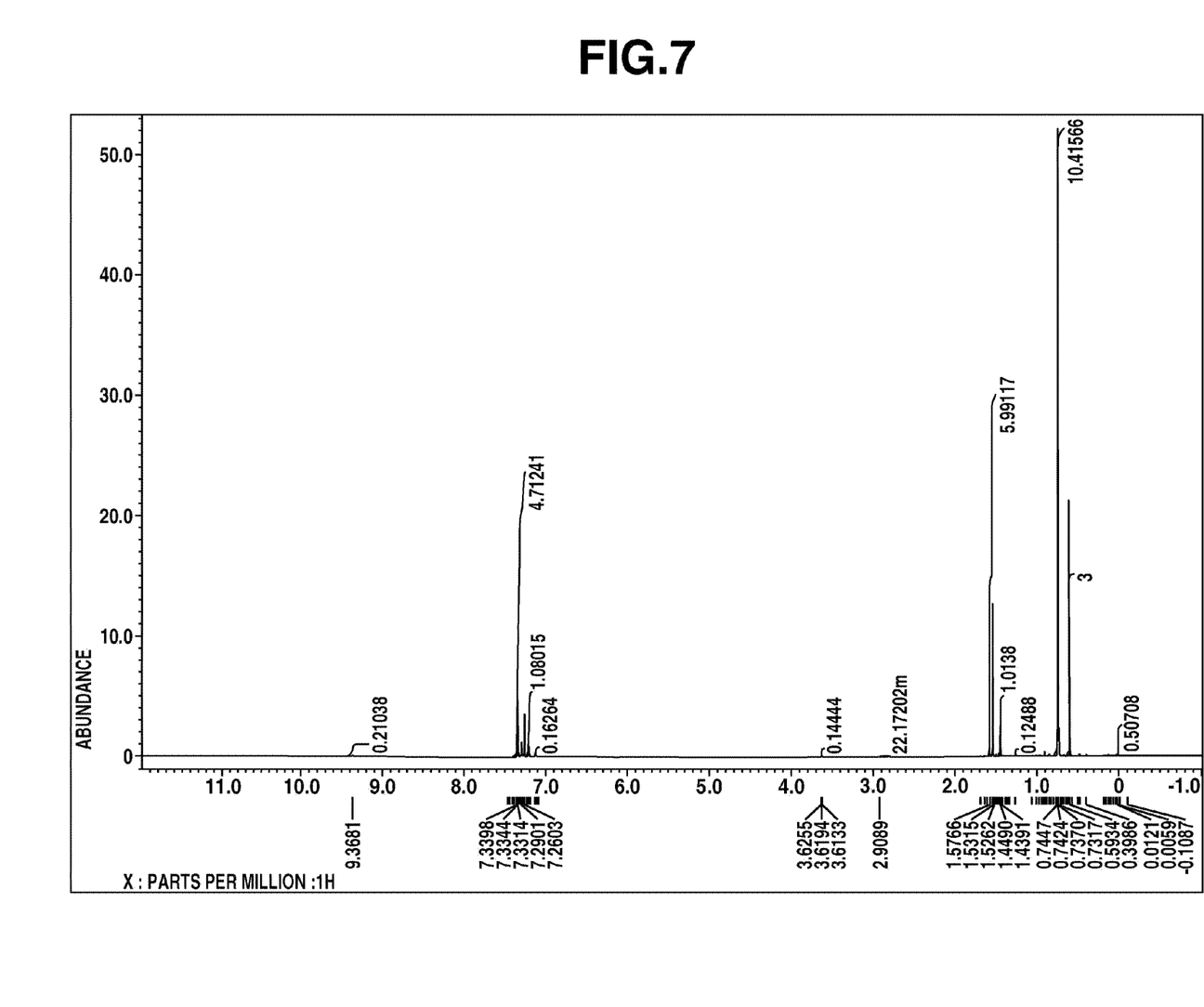
FIGS. 7 and 8 are diagrams showing the $^1$H-NMR and IR spectra of the compound in Example 4, respectively.
Figure 8:
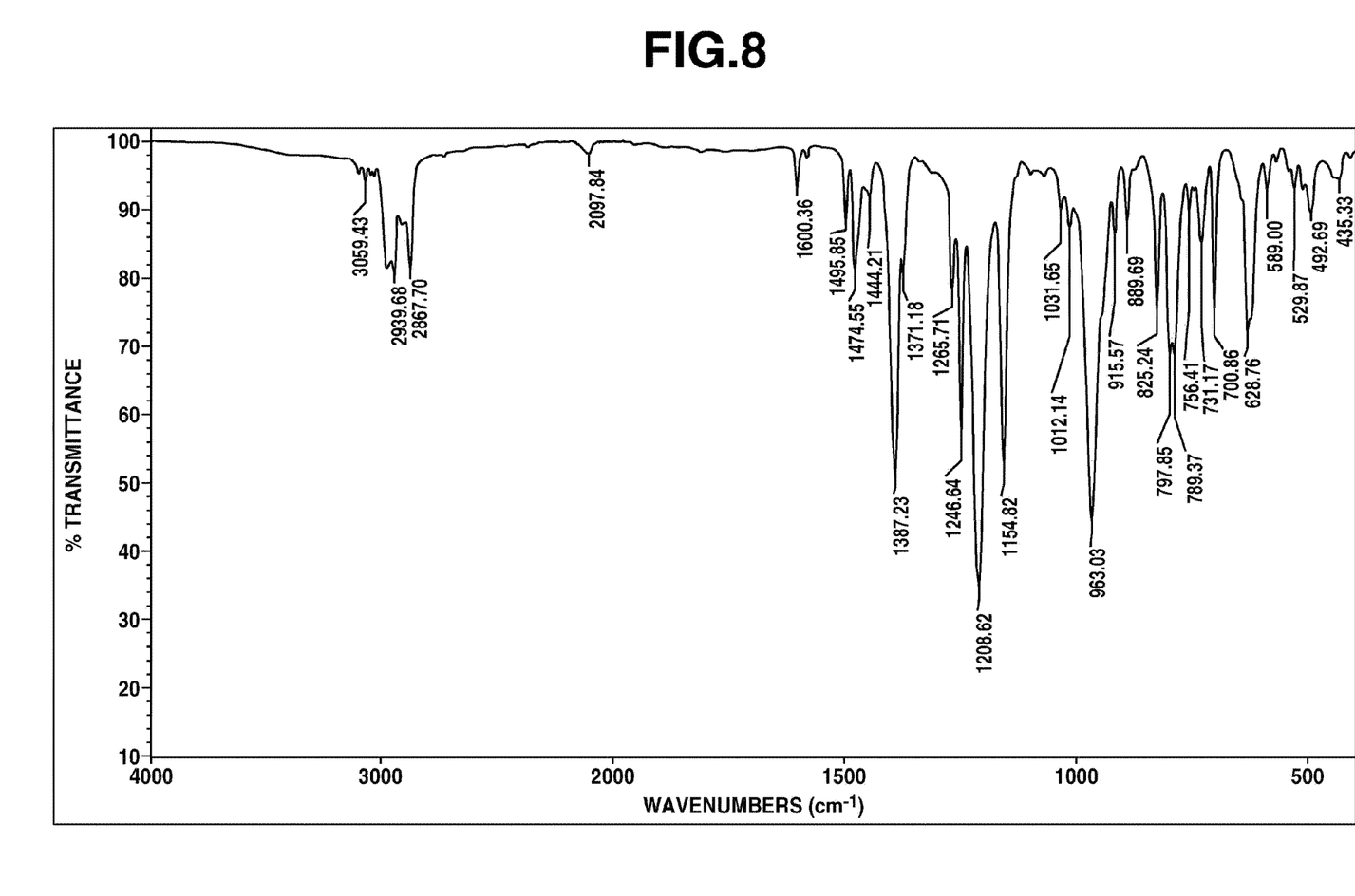

The $^1$H-NMR spectral chart is shown in FIG. 7 and the IR spectral chart is shown in FIG. 8.

From these results, the resulting compound was identified to be tert-butylmethyl(1-methyl-1-phenylethyl)silyltriflate.

Japanese Patent Application No. 2019-105041 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organosilane compound having a bulky substituent group, represented by the general formula (1):

wherein $R^1$ is a $C_4$-$C_{10}$ tertiary hydrocarbon group, $R^2$ is a $C_1$-$C_{10}$ straight alkyl group, and LG is halogen or trifluoromethanesulfonyloxy.

2. The organosilane compound of claim 1 wherein LG is halogen.

3. The organosilane compound of claim 1 wherein LG is trifluoromethanesulfonyloxy.

4. A method for preparing the organosilane compound of claim 2, comprising the step of reacting a hydrogensilane compound having the general formula (2):

wherein $R^1$ and $R^2$ are as defined above, with a halogenating agent.

5. A method for preparing the organosilane compound of claim 3, comprising the step of reacting a hydrogensilane compound having the general formula (2):

(2)

wherein $R^1$ and $R^2$ are as defined above, with trifluoromethanesulfonic acid.

* * * * *